(12) United States Patent
Bando

(10) Patent No.: US 6,336,252 B1
(45) Date of Patent: Jan. 8, 2002

(54) ROTARY DAMPER

(75) Inventor: Ryosuke Bando, Tokyo (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 0 days.

(21) Appl. No.: 09/601,312

(22) PCT Filed: Nov. 30, 1999

(86) PCT No.: PCT/JP99/06674

§ 371 Date: Aug. 4, 2000

§ 102(e) Date: Aug. 4, 2000

(87) PCT Pub. No.: WO00/34679

PCT Pub. Date: Jun. 15, 2000

(30) Foreign Application Priority Data

Dec. 7, 1998 (JP) .......................... 10-346770

(51) Int. Cl.$^7$ .............................. E05F 1/08; E05C 17/64
(52) U.S. Cl. .............................. 16/307; 16/342; 16/50; 16/54
(58) Field of Search .................... 16/307, 342, 339, 16/50, 54, 82; 188/290

(56) References Cited

U.S. PATENT DOCUMENTS

| 4,893,522 A | * | 1/1990 | Arakawa | 16/82 |
| 5,018,244 A | * | 5/1991 | Hino | 16/342 |
| 5,142,738 A | | 9/1992 | Ojima | |
| 5,211,269 A | * | 5/1993 | Ohshima | 16/52 |
| 5,333,356 A | | 8/1994 | Katagiri | 16/342 |
| 5,832,566 A | * | 11/1998 | Quek et al. | 16/342 |
| 5,984,057 A | * | 11/1999 | Nash | 188/290 |
| 6,101,676 A | * | 8/2000 | Wahl et al. | 16/342 |

FOREIGN PATENT DOCUMENTS

| FR | 1 328 493 | | 9/1963 |
| FR | 2 643 433 | | 8/1990 |
| JP | 52-8768 | | 1/1977 |
| JP | 62-81739 | | 5/1987 |
| JP | 3-62978 | | 2/1993 |
| JP | 6-159347 | * | 6/1994 |
| JP | 6-53863 | | 7/1994 |
| JP | 6-221358 | | 8/1994 |

* cited by examiner

Primary Examiner—Chuck Y. Mah
(74) Attorney, Agent, or Firm—Jacobson Holman, PLLC

(57) ABSTRACT

A rotary damper is adapted to exert braking force to an upswung door, a toilet lid or the like when the door is closed and dampen the impact produced by the closing door by a damping force far greater than the one obtained by a conventional rotary damper using viscous shearing resistance. The rotary damper can also make the door open by a force far smaller than a conventional rotary damper. A movable shaft is rotatably housed in a casing and has a cylindrical shaft section including an arcuate non-resilient section extending from a peripheral edge thereof to an axial base line close to the other free peripheral edge thereof and an eccentric resilient section extending from the axial base line to the other free peripheral edge thereof with its eccentricity increasing as a function of the distance from the base line relative to the radius of curvature of the inner peripheral surface so as resiliently abut the inner peripheral surface. The frictional force between the eccentric rest section and the inner peripheral surface increases when the movable shaft is driven to rotate to close the door to which it is fitted but falls remarkably when the movable shaft is driven to rotate in the opposite sense to open the door.

9 Claims, 5 Drawing Sheets

ROTARY DAMPER

BACKGROUND OF THE INVENTION

1. Field of the Invention

This invention relates to an improvement to a rotary damper to make it operate as a shock absorber and act on a turning body such as a door or a toilet lid when the latter is falling down to the closed position.

2. Description of Related Background Art

Japanese Utility Model Laid-Open No. 62-81739 discloses a rotary damper of the type under consideration as shown in FIGS. 7A and 7B of the accompanying drawings.

Referring to FIGS. 7A and 7B, which illustrate an embodiment of a rotary damper according to the above document and adapted to be used for the keyboard lid of a piano. The rotary damper A is linked to the keyboard lid b by way of a join d so that the keyboard lid b may be closed smoothly at an appropriate moving speed without emitting a large bumping sound and/or vibrating violently when it gets to the final closed position.

As seen from FIG. 7B, the rotary damper A comprises a casing e, a movable shaft h loosely fitted into the inner cavity g of the casing e as defined by the inner peripheral surface f thereof with a shaft end i protecting from opening j of the casing e, a pair of O-rings k1 and k2 fitted into the movable shaft h and pressed against the inner peripheral surface f of the casing e so that the gap between the inner peripheral surface f of the casing e and the movable shaft h is hermetically sealed and viscous fluid m is watertightly contained in the gap and a torsion spring p having anchoring ends q1 and q2 secured respectively to projecting section I of the movable shaft h and closure section r of the casing e.

With the above described known rotary damper A, the viscous shearing resistance generated in the viscous fluid watertightly contained in the gap between the inner peripheral surface f of the casing e and the movable shaft h that is typically polymeric viscous fluid such as polyisobutyne or the like as a result of a rotary motion of the cylindrical shaft h is utilized as a damping force.

Thus, the rotary damper A as described above is accompanied by a number of drawbacks including that it cannot provide a sufficient and satisfactory damping effect when the viscous shearing resistance is used as a sole source of damping power, that it requires a high level of machining precision because the torque of the damper changes from the expected value if the size of the gap varies from the designed value, that the components including the casing e, the movable shaft h, the O-rings k1, k2 and the viscous fluid m are large in number and costly and that, while the torque of the damper effectively operates when the keyboard lid b is closed, a substantially same viscous shearing resistance appears also when the keyboard lid b is opened.

SUMMARY OF THE INVENTION

In view of the above identified problems of the prior art, it is therefore the object of the present invention to provide a rotary damper comprising only a casing and a movable shaft having a cylindrical shaft section that includes an arched non-resilient section and an eccentric resilient section extending peripherally outwardly from the arched non-resilient section to show a diametrical size greater than that of the inner peripheral surface of the casing so that the outer peripheral surface of the eccentric resilient section may resiliently slide on the inner peripheral surface of the casing.

With such an arrangement, torque is generated in the damper due to the considerably large frictional force that arises between the inner peripheral surface of the casing and the eccentric resilient section when the movable shaft is driven to rotate toward the free end of the eccentric resilient section, whereas the frictional force can be reduced greatly without providing the viscous fluid with a specific flow path unlike the prior art that utilizes the viscous shearing resistance of the viscous fluid when the movable shaft is subjected to a rotary force trying to rotate it in the opposite sense. Thus, a large torque can be obtained in the damper principally comprising only two components without requiring an enhanced level of machining precision.

The above object is achieved by providing a rotary damper comprising a casing and a movable shaft having a cylindrical shaft section loosely, freely rotatably and unreleasably fitted into the inner cavity of the casing as defined by the inner peripheral surface thereof and a shaft end section linked to the cylindrical shaft section and projecting from the opening of the casing, said cylindrical shaft section of the movable shaft including an arcuate non-resilient section extending from a peripheral edge thereof to an axial base line close to the other free peripheral edge thereof and an eccentric resilient section extending from said axial base line to the other free peripheral edge thereof with its eccentricity increasing as a function of the distance from said base line relative to the radius of curvature of the inner peripheral surface so as to resiliently abut the inner peripheral surface.

The above object can be achieved highly reliably when the eccentric resilient section is formed by cutting the cylindrical shaft section of the movable shaft to produce an axial slit and a radial sit perpendicular to said axial slit that defines the eccentric resilient section extending from the arcuate non-resilient section.

Thus, there is provided a rotary damper comprising a casing and a movable shaft having a loose cylindrical shaft section freely rotatably and unreleasably fitted into the inner cavity of the casing as defined by the inner peripheral surface thereof and a shaft end section linked to the cylindrical shaft section and projecting from the opening of the casing, said cylindrical shaft section of the movable shaft including an arcuate non-resilient section extending from a peripheral edge thereof to an axial base line close to the other free peripheral edge thereof and formed by cutting the cylindrical shaft section from the closure side to produce an axial slit defining said peripheral edge and the other free peripheral edge and then from the end of said axial slit located close to the shaft end section perpendicularly relative to said axial slit to produce a radial slit and an eccentric resilient section extending from said axial base line to the other free peripheral edge thereof with its eccentricity increasing as a function of the distance from said base line relative to the radius of curvature of the inner peripheral surface so as to resiliently abut the inner peripheral surface.

Preferably, viscous fluid is watertightly sealed in the cavity of the casing including the gap between the inner peripheral surface of the casing and the eccentric resilient section by using a sealing O-ring so that not only the damping effect of the torque of the damper generated by said eccentric resilient section is boosted by the shearing resistance of the viscous fluid sealed in the cavity but also the viscous fluid operates as a lubricant to make the movable shaft rotate smoothly and increase the durability of the rotary damper.

Thus, in a rotary damper, viscous fluid is watertightly contained in the cavity of said casing by means of a sealing O-ring arranged between the shaft end section of the movable shaft and the inner peripheral surface of the casing.

Preferably, the volume of the viscous fluid contained in the cavity of the casing is reduced and, at the same time, the torque of the damper is increased by the viscous fluid contained in the cavity of the casing to provide to a sufficiently large viscous shearing resistance and a damping effect greater than the one obtained by the arrangement where an axial rod having a diameter slightly smaller than that of the cylindrical space defined by the inner peripheral surface of the cylindrical shaft section of the movable shaft is made to project from the closure of the casing.

Thus, in a rotary damper, an axial rod having a diameter slightly smaller than that of the cylindrical space defined by the inner peripheral surface of the cylindrical shaft section of the movable shaft is provided and projecting from the closure of the casing.

Preferably, a sufficiently large damping effect is obtained and, if the lid to be used with the rotary damper is very heavy, it can be dosed slowly and opened with ease by the resilient force of a spring when a torsion bar spring or a coil spring is contained in the cavity of the casing in addition to the movable shaft having the eccentric resilient section and the opposite ends of the spring are securely held to the movable shaft and the casing respectively so that the torque of the torsion bar spring or the coil spring is added to the torque of the damper due to the resilient force of the eccentric resilient section.

Thus, in a rotary damper, a torsion bar spring or a coil spring is contained in the cavity of the casing and the opposite ends of the spring are securely held respectively to the casing and the movable shaft.

Still preferably, not only viscous fluid is watertightly sealed in the cavity of the casing and the eccentric resilient section but also a torsion bar spring or a coil spring is contained in the cavity to exploit both the viscous shearing resistance of the viscous fluid and the resiliency of the spring to boost the torque of the damper.

Thus, in a rotary damper, viscous fluid is watertightly contained in the cavity of said casing by means of a sealing O-ring arranged between the shaft end section of the movable shaft and the inner peripheral surface of the casing and a torsion bar spring or a coil spring is contained in the cavity with the opposite ends of the spring securely held respectively to the casing and the movable shaft.

Still preferably, in additional to the use of an eccentric resilient section and a torsion bar spring or a coil spring, said other free peripheral edge is constantly urged outwardly to press the inner peripheral surface of the casing by rigidly securing an end of the spring to the casing and inserting the other end between said peripheral edge and said other free peripheral edge of the cylindrical shaft section of said movable shaft so as to make it resiliently abut and exert the effect of the spring onto said other free peripheral edge in order to avoid a situation where the eccentric resilient section is crept to reduce the pressure of the eccentric resilient section against the inner peripheral surface. Then, any reduction with time of the resiliency of the eccentric resilient section and hence that of the torque of the damper can be prevented from taking place.

Thus, in a rotary damper, a torsion bar spring or a coil spring is contained in the cavity of the casing with an end thereof securely held to the casing and the other end inserted between said peripheral edge and said other free peripheral edge of the cylindrical shaft section of said movable shaft so as to make it resiliently abut said other free peripheral edge.

Still preferably, the eccentric resilient section is prevented from being crept to prevent any reduction with time of the resiliency of the eccentric resilient section and hence that of the torque of the damper from taking place even when no spring is used to urge the eccentric resilient section to press the inner peripheral surface of the casing.

Thus, in a rotary damper, a resilient member is inserted between said peripheral edge and said other free peripheral edge of the cylindrical shaft section of said movable shaft to urge said eccentric resilient section so as to press the inner peripheral surface of the casing.

Still preferably, the torque of the damper can reliably be provided to a large extent by the eccentric resilient section without using any additional member simply by arranging a projection in the casing.

Thus in a rotary damper, a notch is formed in said arcuate non-resilient section from said peripheral edge of said cylindrical shaft section to make it open to said axial slit and an inner projection is formed on the inner peripheral surface of said casing with its height increasing in the sense of extension of said eccentric resilient section and adapted to be received in said notch so as to make said eccentric resilient section of said movable shaft to be resiliently urged toward the center of the cavity when laid on said inner projection by the rotary motion of the movable shaft.

DESCRIPTION OF THE PREFERRED
EMBODIMENTS OF THE INVENTION

Now, the present invention will be described by referring to the accompanying drawings that illustrate preferred embodiments of the invention.

Figure 1A:
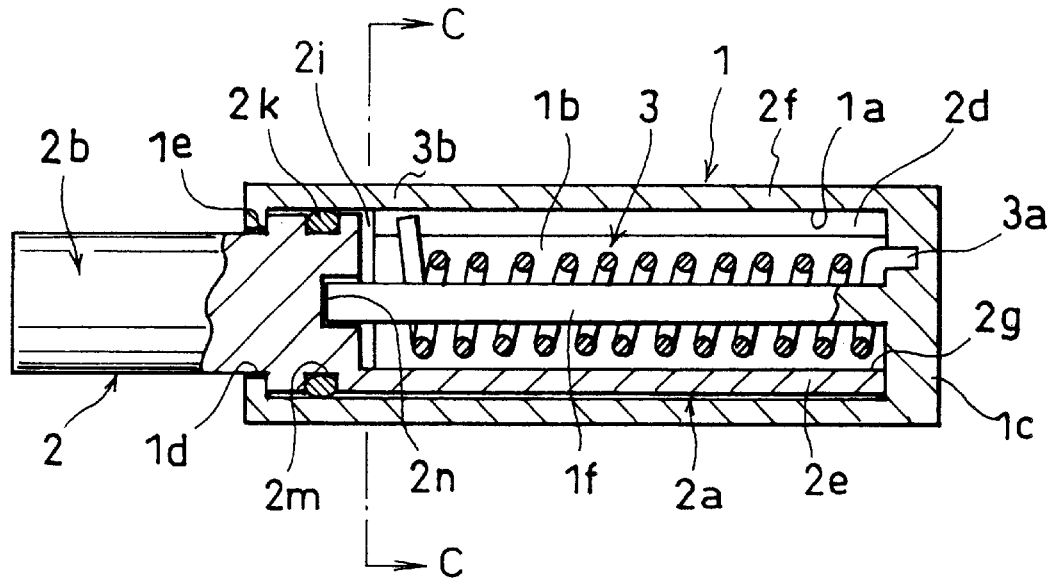
FIG. 1A is a schematic cross sectional front view of an embodiment of a rotary damper according to the invention.
Figure 1B:
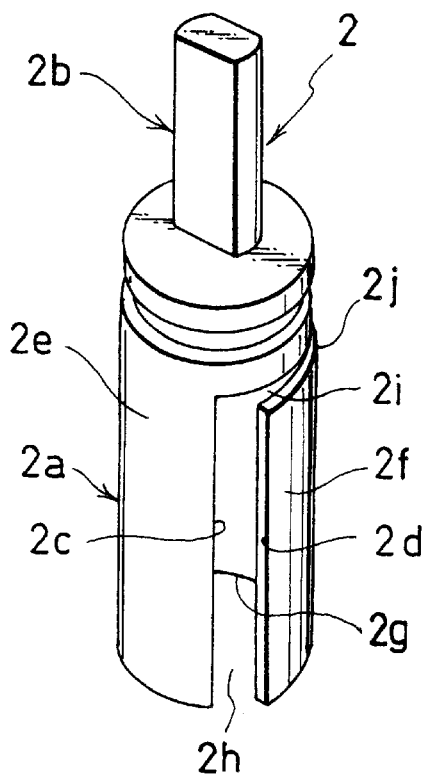
FIG. 1B is a schematic perspective view of the movable shaft of the embodiment of FIG. 1A.
Figure 1C:
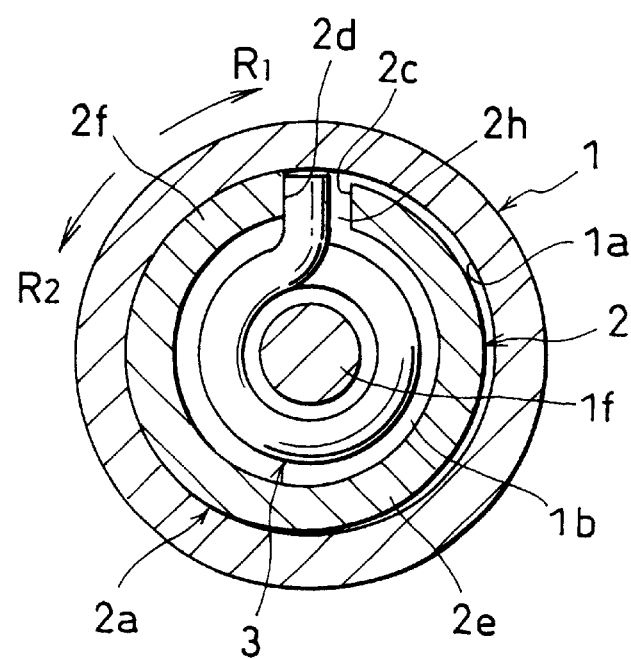
FIG. 1C is a schematic cross sectional side view of the embodiment of FIG. 1 taken along line C—C.

FIGS. 1A through 1C schematically illustrate an embodiment of a rotary damper according to the invention comprising a casing 1 and a movable shaft 2. The casing 1 is rigidly secured to a predetermined position and the movable shaft 2 is linked to a door, a toilet lid or the like. However, it may be so arranged that inversely the movable shaft 2 is rigidly secured to a predetermined position and the casing 1 is made to be movable with a door or the like.

Said casing has in it a cavity 1b defined by the inner peripheral surface 1a of the casing and dosed at an end thereof by a closure section 1c but open at the other end to provide an opening 1d there.

On the other hand, the movable shaft 2 has a cylindrical shaft section 2a loosely and rotatably contained in the cavity 1b of the casing 1 but unreleasably held in the cavity 1b by an anti-release edge section 1e of the casing 1 and a shaft end section 2b linked to the cylindrical shaft section 2a and projecting out of the casing through the opening 1d.

The cylindrical shaft section 2a of the movable shaft 2 includes an arcuate non-resilient section 2e extending from a peripheral edge 2c thereof to an axial base line close to the other free peripheral edge 2d thereof and an eccentric resilient section 2f extending from said arcuate non-resilient section 2e to the other free peripheral edge 2d thereof. The eccentricity of the eccentric resilient section 2f increases as a function of the distance from said base line relative to the radius of curvature of the inner peripheral surface.

In other words, the eccentric resilient section 2f projects gradually and outwardly from the arcuate non-resilient section 2e toward the other free peripheral edge 2d.

When assembling, the movable shaft 2 is put into the cavity 1b of the casing 2 while the eccentric resilient section 2f is pushed inwardly and then the casing 1 is bent at the opening 1d to form an ant-release edge 1e there so that the movable shaft 2 may not come out of the casing 1. Thus, the eccentric resilient section 2f abuts and resiliently pushes the inner peripheral surface 1a of the casing due to its resiliency.

While the arcuate non-resilient section 2e and the eccentric resilient section 2f may be formed in various different ways by using various different means, in the case of the movable shaft 2 of FIG. 1, it is provided with an open end 2g located at the side of the closure 1c of the casing land an axial sit 2h is formed by cutting the cylindrical shaft section 2a from a position dose to the shaft end section 2b to the open end 2g to produce said peripheral edge 2c and said other free peripheral edge 2d.

Then, a radial slit is formed by cutting the cylindrical shaft section 2a from the end of the axial slit 2h dose to the shaft end section 2b perpendicularly relative to the axial sift 2h. Thus, the cylindrical non-resilient section 2e is defined by said peripheral edge 2c and the axial base line extending from the base end 2j of the radial slit 2i while the eccentric resilient section 2f is defined by the axial base line and the other free peripheral edge 2d.

Therefore, with the above embodiment, the eccentric resilient section 2f is made to abut and resiliently press the inner peripheral surface 1a of the casing as illustrated in FIG. 1C so that, if the movable shaft 2 is driven to rotate in the sense or arrow R1 (clockwise) with a door or the like, the other free peripheral edge 2d exerts a considerably large frictional force to the inner peripheral surface 1a as it is driven to rotate to consequently generate a large torque of the damper due to the rotative motion of the movably shaft 2. Then, the door or the like will be closed slowly without giving rise to any unintended impact.

If, on the other hand, the movable shaft 2 is driven to rotate in the sense of arrow $R_2$ (counterclockwise) with the door or the like, the frictional force of the movable shaft 2 is reduced greatly when compared with the case of its rotary motion in the sense of arrow 1 (clockwise) so that the door or the like can be opened with a relatively small effort. Thus, the present invention can ensure a large torque for the damper if compared with a conventional rotary damper whose damping effect relies only on the viscous fluid it contains.

Another embodiment differs from the above embodiment in that it additionally utilizes the shearing resistance of viscous fluid. Thus, this embodiment comprises, in addition to the components of the above embodiment, viscous fluid that is watertightly sealed in the cavity of the casing by means of a sealing O-ring 2k arranged between the shaft end section 2b of the movable shaft 2 and the inner peripheral surface 1a of the casing as shown in FIG. 1A. More specifically, the shaft end section 2b is provided with an annular groove 2m in an area thereof located within the casing 1 and the sealing O-ring 2k is fitted into the groove to prevent the viscous fluid from flowing out.

Thus, the shearing resistance of the viscous fluid is added to the torque of the damper due to the eccentric resilient section 2f to boost the overall torque. Additionally, since viscous fluid is also filled in the gap between the inner peripheral surface 1a of the casing and the eccentric resilient section 2f, the viscous fluid operates not only to boost the damping effect but also as a lubricant that makes the movable shaft 2 rotate smoothly and improves the durability of the rotary damper.

An axial rod 1f is provided in additional to the eccentric resilient section 2f and the viscous fluid. As also shown in FIGS. 1A and 1C, the axial rod 1f projects from the closure 1c into the cavity 1b of the casing 1 with its front end received in a bearing prot 2n formed in the shaft end section 2b of the movable shaft 2.

Figure 3:
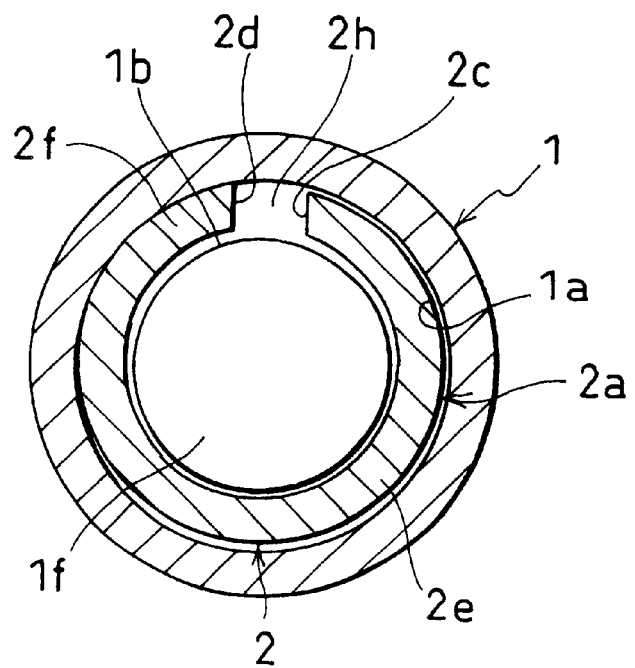
FIG. 3 is a schematic cross sectional side view of still another embodiment of a rotary damper according to the invention.

The axial rod if has a diameter slightly smaller than that of the cylindrical space defined by the inner peripheral surface of the cylindrical shaft section 2a of the movable shaft 2 as seen from FIG. 3. With this arrangement, not only the volume watertightly contained by means of the sealing O-ring 2k can be reduced but also the viscous shearing resistance of the viscous fluid can be increased because the gap between the axial rod 1f and the cylindrical shaft section 2a is very small.

Figure 2:
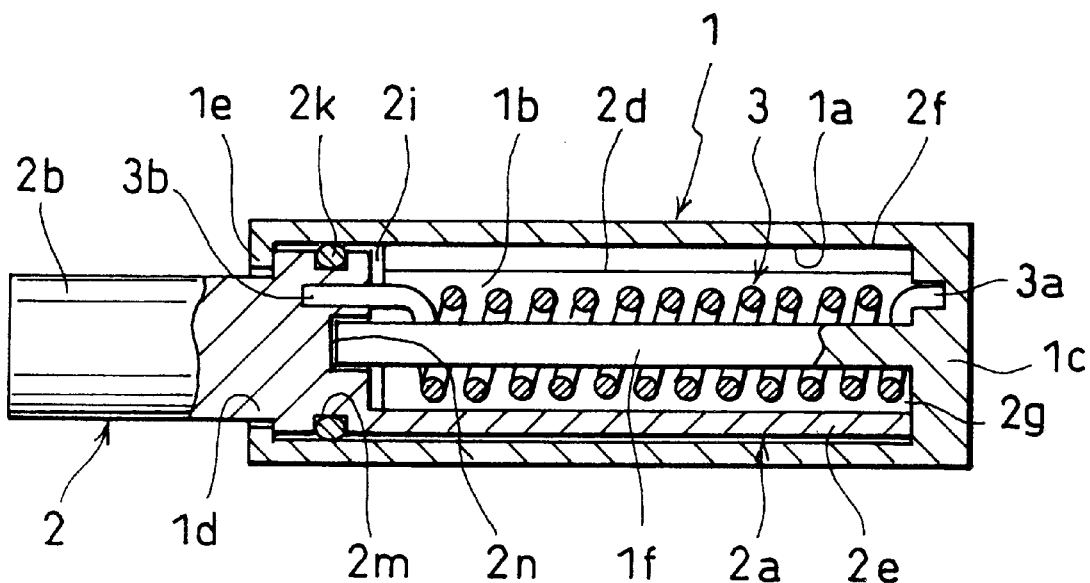
FIG. 2 is a schematic cross sectional front view of another embodiment of a rotary damper according to the invention.

A rotary damper is additionally provided with a torsion bar spring (not shown) or a coil spring 3 as shown in FIG. 1A and FIG. 2. The opposite ends of the torsion bar spring or those ends 3a, 3b of the coil spring 3 contained in the cavity 1b of the casing 1 are anchored respectively to the closure 1c of the casing 1 and the shaft end section 2b of the movable shaft 2. In the illustrated instance, the coil spring is arranged around the axial rod 1f.

Thus, with this arrangement, the resiliency of the torsion bar spring or the coil spring is added to the torque of the damper due to the resiliency of the eccentric resilient section 2f so that a considerably heavy door can be dosed slowly and opened easily due to the resiliency of the spring.

A rotary damper comprising an eccentric resilient section 2f is additionally provided with viscous fluid as described above and a torsion bar spring or a coil spring. Thus, with this arrangement, the effect of the eccentric resilient section 2f, that of the viscous fluid and that of the spring are effectively exploited in a coordinated manner to satisfactorily achieve the object of the invention.

If the movable shaft 2 of a rotary damper is made of synthetic resin, it can easily creep over time if compared with a movable shaft made of metal so that the frictional force generated between the eccentric resilient section 2f of the movable shaft 2 and the inner peripheral surface 1a of the casing 1 can be reduced from the initial level even if the rotary damper is left unused.

This problem is dissolved not by anchoring the end 3b of the torsion bar spring or the coil spring 3 to the shaft end section 2b but by inserting it between the peripheral edge 2c and the other free peripheral edge 2d of the cylindrical shaft section 2a of the movable shaft 2 as shown in FIG. 2 to make it resiliently abut said other free peripheral edge 2d.

Thus, the resiliency of the eccentric resilient section 2f is made to be constantly applied to the other free peripheral edge 2d by utilizing a torsion bar spring or a coil spring 3 in order to press the eccentric resilient section 2f outwardly so that the eccentric resilient section 2f is prevented from creeping and becoming deformed and hence the torque of the rotary damper can be maintained for a prolonged period of time without any problem.

The eccentric resilient section 2f of synthetic resin is prevented from being subjected to creep phenomenon not by using a torsion bar spring or a coil spring 3 but by means of a separately provided resilient member 4.

Figure 4A:
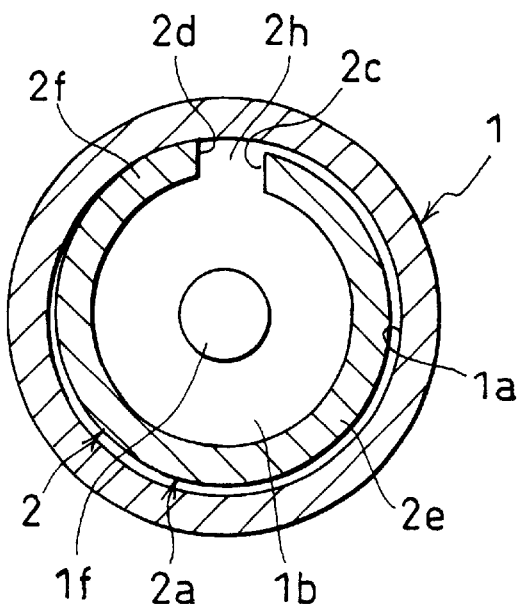
FIG. 4A is a schematic cross sectional side view of still another embodiment of a rotary damper according to the invention, illustrating the eccentric resilient section crept and deformed.
Figure 4B:
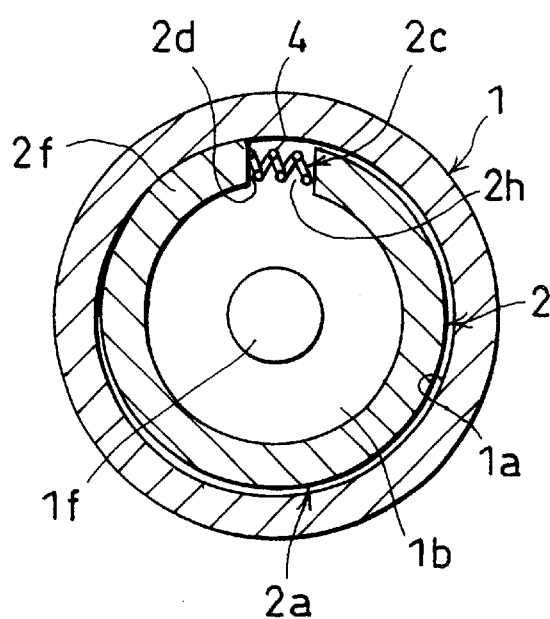
FIG. 4B is a schematic cross sectional side view of the embodiment of FIG. 4A, illustrating a resilient member inserted into the slit of the movable shaft.
Figure 5:
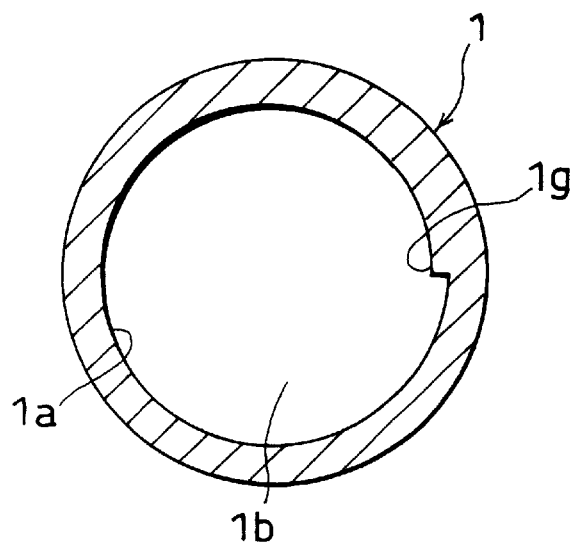
FIG. 5 is a schematic cross sectional side view of the casing of still another embodiment of a rotary damper according to the invention.

As shown in FIG. 4A, when the eccentric resilient section 2f is crept and deformed, the force with which the eccentric resilient section 2f resiliently abut the inner peripheral surface 1a of the casing 1 falls and only the outer peripheral surface of a front end portion of the eccentric resilient section 2f located close to the other free peripheral edge 2d abuts the inner peripheral surface 1a. This problem is avoided by inserting a resilient member 4, which may be a coil spring, a leaf spring or some other resilient piece, between the peripheral edge 2c and the other free peripheral edge 2d of the cylindrical shaft section 2a of the movable shaft 2 as shown in FIG. 4B in order to press the eccentric resilient section 2f against the inner peripheral surface of the casing 1.

Figure 6A:
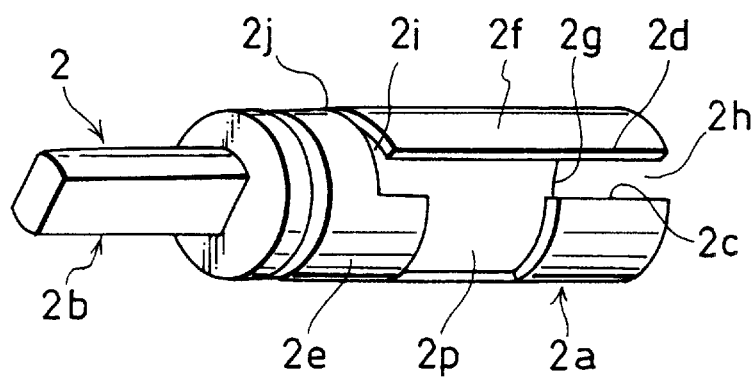
FIG. 6A is a schematic perspective view of the movable shaft of the embodiment of FIG. 5.
Figure 6B:
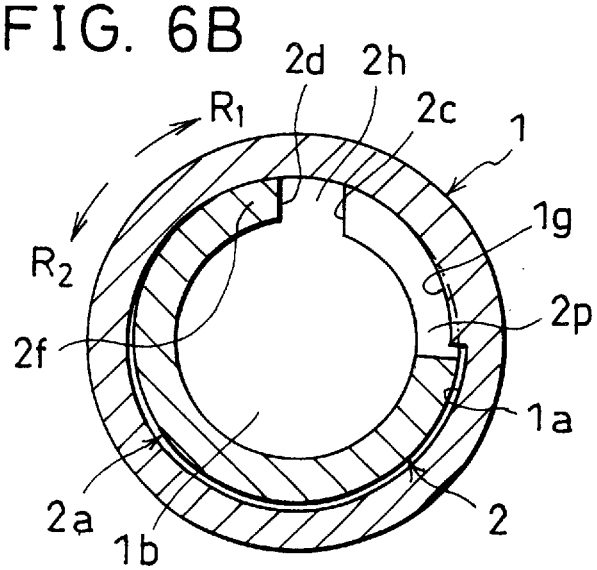
FIG. 6B is a schematic cross sectional side view of the embodiment of FIG. 5 when the lid provided with the embodiment is open.
Figure 6C:
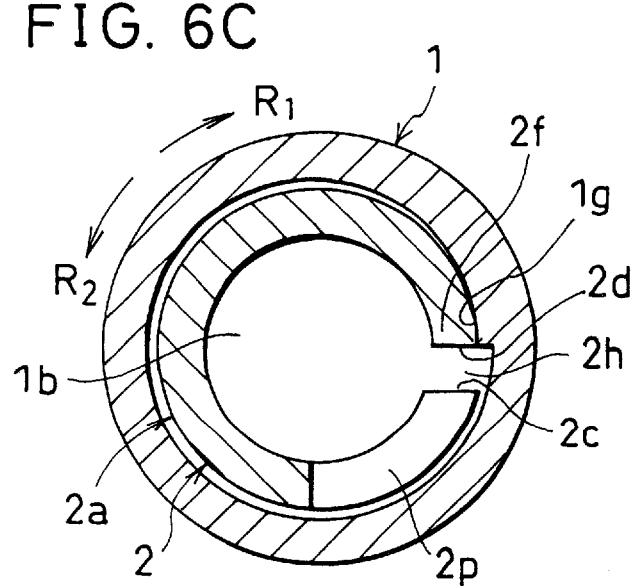
FIG. 6C is a schematic cross sectional side view of the embodiment of FIG. 5 when the lid provided with the embodiment is dosed.
Figure 7A:
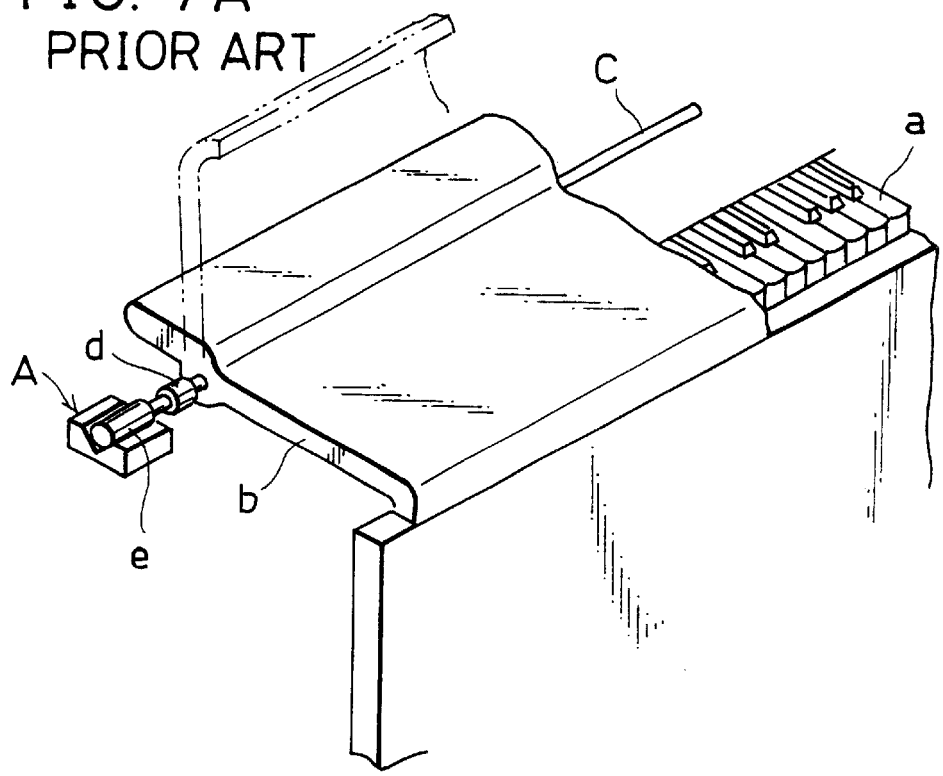
FIG. 7A is a schematic perspective view of a known rotary damper as applied to the lid of the keyboard of a piano.
Figure 7B:
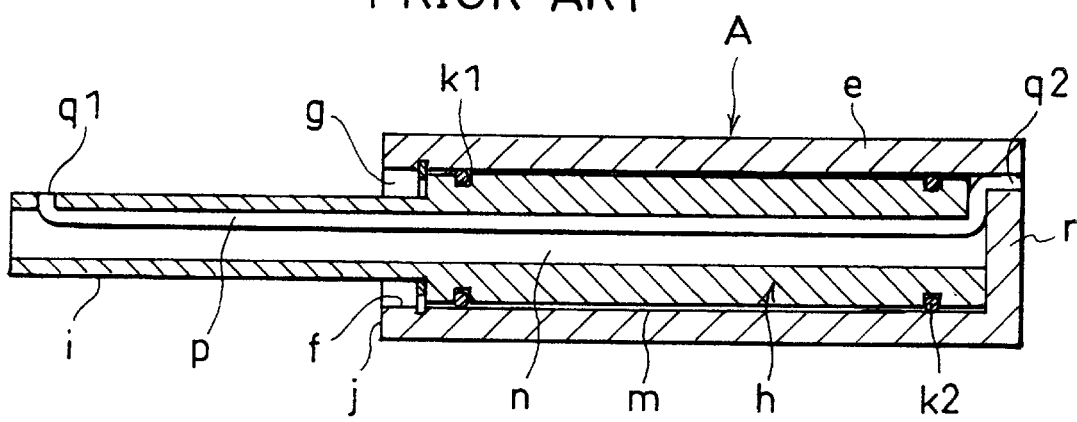
FIG. 7B is a schematic cross sectional front view of the known rotary damper of FIG. 7A.

As shown in FIGS. 5 and 6A through 6C, the inner peripheral surface 1a of the casing 1 does not show a uniform diameter but an inner projection 1g is formed thereon in a manner as will be described hereinafter. Firstly referring to FIG. 6A, a notch 2p is formed in the arcuate non-resilient section 2e from the peripheral edge 2c of said cylindrical shaft section 2a to make it open to said axial slit 2h. On the other hand, an inner projection 1g is formed on the inner peripheral surface 1a of the casing 1 with its height increasing in the sense of extension of the eccentric resilient section 2f. Thus, the inner projection 1g is received in the notch 2p when they are in a state as shown in FIG. 6B. However, as the movable shaft 2 is driven to rotate in the sense of arrow R1 in FIG. 6C and the eccentric resilient section 2f of the movable shaft 2 is brought to a position where it is laid on the inner projection 1g, the eccentric resilient section 2f is gradually pushed toward the center of the cavity 1b so that the torque of the rotary damper generated by the eccentric resilient section 2f is increased, although the rotary damper also has a simple configuration.

A rotary damper according to the invention is described in detail above by referring to the accompanying drawings that illustrate preferred embodiments of the invention.

A rotary damper comprises only a casing and a movable shaft and a large frictional force can be generated between them without using viscous fluid when the movable shaft is driven to rotate in a sense of rotation whereas only a relatively small frictional force is generated when the movable shaft is driven to rotate in the opposite sense. Thus, a rotary damper comprises a fewer number of components if compared with a known rotary damper using viscous fluid and any high machining precision level is required to it. Such a rotary damper performs uniformly and can be manufactured at low cost.

An axial slit and a radial slit are formed in the cylindrical shaft section and made to communicate with each other to improve the effect and the reliability of a rotary damper.

The viscous shearing resistance of viscous fluid is utilized to boost the torque of a rotary damper. The viscous fluid not only boosts the torque of the rotary damper but operates as lubricant between the eccentric resilient section and the inner peripheral surface of the casing to improve the smooth operation and the durability of the rotary damper.

The casing is provided with an axial rod projecting therefrom and located close to the inner peripheral surface of the cylindrical shaft section in order to reduce the volume of viscous fluid contained in the cavity of the casing and increase the viscous shearing resistance of the viscous fluid for achieving a satisfactory damping effect.

A torsion bar spring or a coil spring is used in addition to the eccentric resilient section to boost the torque of a rotary damper. With this arrangement, the closing motion of a heavy door can be appropriately braked but the door can be opened without significant effort to a great satisfaction of the user.

A rotary damper is made to additionally comprise viscous fluid and a torsion bar spring or a coil spring so that the user can get an even grater satisfaction.

The arrangement of a torsion bar spring or a coil spectral is modified in such a way that the spring is made at an end thereof to resiliently abut the other free peripheral edge. With this arrangement, the eccentric resilient section of the movable shaft is prevented from beginning to creep and becoming deformed to reduce the force with which it resiliently abuts the inner peripheral surface of the cavity so that the rotary damper will maintain its desired torque reliably for a prolonged period of time.

The torsion bar spring or the coil spring is replaced by a relatively small resilient member that is inserted between the peripheral edge and the other free peripheral edge of the cylindrical shaft section of the movable shaft.

An inward projection is provided on the inner peripheral surface of the casing to increase the torque of the damper generated by the eccentric resilient section to improve the satisfaction of the user.

What is claimed is:

1. A rotary damper comprising a casing and a movable shaft having a cylindrical shaft section loosely, freely rotatably and unreleasably fitted into an inner cavity of the casing as defined by an inner peripheral surface thereof and a shaft end section linked to the cylindrical shaft section and projecting from an opening of the casing, said cylindrical shaft section of the movable shaft including an arcuate non-resilient section extending between a peripheral edge to an axial base line and an eccentric resilient section extending between said axial base line to another free peripheral edge with an eccentricity of said eccentric resilient section increasing as a function of a distance from said base line so as to resiliently abut the inner peripheral surface.

2. A rotary damper comprising a casing and a movable shaft having a cylindrical shaft section loosely, freely rotatably and unreleasably fitted into an inner cavity of the casing as defined by an inner peripheral surface thereof and a shaft end section linked to the cylindrical shaft section and projecting from an opening of the casing, said cylindrical shaft section of the movable shaft including an arcuate non-resilient section extending between a peripheral edge to an axial base line and an eccentric resilient section being formed by cutting the cylindrical shaft section from a closure side to produce an axial slit defining another peripheral edge and then from an end of said axial slit located close to a shaft end section perpendicularly relative to said axial slit to produce a radial slit and the eccentric resilient section extending from said axial base line to the another free peripheral edge thereof with an eccentricity of the eccentric resilient section increasing as a function of a distance from said base line so as to resiliently abut the inner peripheral surface.

3. A rotary damper comprising a casing and a movable shaft having a cylindrical shaft section loosely, freely rotatably and unreleasably fitted into an inner cavity of the casing as defined by an inner peripheral surface thereof and a shaft end section linked to the cylindrical shaft section and projecting from an opening of the casing, said cylindrical shaft section of the movable shaft including an arcuate non-resilient section extending between a peripheral edge to an axial base line and an eccentric resilient section extending between said axial base line to another free peripheral edge with an eccentricity of said eccentric resilient section increasing as a function of a distance from said base line so as to resiliently abut the inner peripheral surface, viscous fluid being watertightly contained in the inner cavity of said casing by a sealing O-ring arranged between a shaft end section of the movable shaft and the inner peripheral surface of the casing.

4. A rotary damper comprising a casing and a movable shaft having a cylindrical shaft section loosely, freely rotatably and unreleasably fitted into an inner cavity of the casing as defined by an inner peripheral surface thereof and a shaft end section linked to the cylindrical shaft section and projecting from an opening of the casing, said cylindrical shaft section of the movable shaft including an arcuate non-resilient section extending between a peripheral edge to an axial base line and an eccentric resilient section extending between said axial base line to another free peripheral edge with an eccentricity of said eccentric resilient section increasing as a function of a distance from aid base line so as to resiliently abut the inner peripheral surface, viscous fluid being watertightly contained in the inner cavity of said casing by a sealing O-ring arranged between a shaft end section of the movable shaft and the inner peripheral surface of the casing, an axial rod having a diameter smaller than that of a cylindrical space defined by the inner peripheral surface of the cylindrical shaft section of the movable shaft, said axial rod projecting from a closure of the casing.

5. A rotary damper comprising a casing and a movable shaft having a cylindrical shaft section loosely, freely rotatably and unreleasably fitted into an inner cavity of the casing as defined by an inner peripheral surface thereof and a shaft end section linked to the cylindrical shaft section and projecting from an opening of the casing, said cylindrical shaft section of the movable shaft including an arcuate non-resilient section extending between a peripheral edge to an axial base line and an eccentric resilient section extending between said axial base line to another peripheral edge with an eccentricity of said eccentric resilient section increasing as a function of a distance from said base line so as to resiliently abut the inner peripheral surface, a torsion bar spring or a coil spring being contained in the inner cavity of the casing, opposite ends of said spring being securely held respectively to the casing and the movable shaft.

6. A rotary damper comprising a casing and a movable shaft having a cylindrical shaft section loosely, freely rotatably and unreleasably fitted into an inner cavity of the casing as defined by an inner peripheral surface thereof and a shaft end section linked to the cylindrical shaft section and projecting from an opening of the casing, said cylindrical shaft section of the movable shaft including an arcuate non-resilient section extending between a peripheral edge to an axial base line and an eccentric resilient section extending between said axial base line to another peripheral edge with an eccentricity of said eccentric resilient section increasing as a function of a distance from said base line so as to resiliently abut the inner peripheral surface, viscous fluid being watertightly contained in the inner cavity of said casing by a sealing O-ring arranged between a shaft end section of the movable shaft and the inner peripheral surface of the casing, a torsion bar spring or a coil spring being contained in the inner cavity with opposite ends of the spring securely held respectively to the casing and the movable shaft.

7. A rotary damper comprising a casing and a movable shaft having a cylindrical shaft section loosely, freely rotatably and unreleasably fitted into an inner cavity of the casing as defined by an inner peripheral surface thereof and a shaft end section linked to the cylindrical shaft section and projecting from an opening of the casing, said cylindrical shaft section of the movable shaft including an arcuate non-resilient section extending between a peripheral edge to an axial base line and an eccentric resilient section extending between said axial base line to another free peripheral edge with an eccentricity of said eccentric resilient section increasing as a function of a distance from said base line so as to resiliently abut the inner peripheral surface, a torsion bar spring or a coil spring being contained in the cavity of the inner casing with one end of the spring securely held to the casing and the other end inserted between said peripheral edge and said another free peripheral edge of the cylindrical shaft section of said movable shaft so as to make the spring resiliently abut said another free peripheral edge.

8. A rotary damper comprising a casing and a movable shaft having a cylindrical shaft section loosely, freely rotatably and unreleasably fitted into an inner cavity of the casing as defined by an inner peripheral surface thereof and a shaft end section linked to the cylindrical shaft section and projecting from an opening of the casing, said cylindrical shaft section of the movable shaft including an arcuate non-resilient section extending between a peripheral edge to an axial base line and an eccentric resilient section extending between said axial base line to another free peripheral edge with an eccentricity of said eccentric resilient section increasing as a function of a distance from said base line so as to resiliently abut the inner peripheral surface, a resilient member being inserted between said peripheral edge and said another free peripheral edge of the cylindrical shaft section of said movable shaft to urge said eccentric resilient section so as to press the inner peripheral surface of the casing.

9. A rotary damper comprising a casing and a movable shaft having a cylindrical shaft section loosely, freely rotatably and unreleasably fitted into an inner cavity of the casing as defined by an inner peripheral surface thereof and a shaft end section linked to the cylindrical shaft section and projecting from an opening of the casing, said cylindrical shaft section of the movable shaft including an arcuate non-resilient section extending between a peripheral edge to an axial base line and an eccentric resilient section being formed by cutting the cylindrical shaft section from a closure side to produce an axial slit defining another peripheral edge and then from an end of said axial slit located close to a shaft end section perpendicularly relative to said axial slit to produce a radial slit and the eccentric resilient section extending from said axial base line to the another free peripheral edge thereof with an eccentricity of the eccentric resilient section increasing as a function of a distance from said base line so as to resiliently abut the inner peripheral surface, a notch being formed in said arcuate non-resilient section between said peripheral edge of said cylindrical shaft section to said axial slit, an inner projection being formed on the inner peripheral surface of said casing to be received in said notch so as to make said eccentric resilient section of said movable shaft to be resiliently urged toward a center of the inner cavity when laid on said inner projection by rotary motion of the movable shaft.

* * * * *